(12) United States Patent
Wares

(10) Patent No.: US 9,322,547 B2
(45) Date of Patent: Apr. 26, 2016

(54) FIRE IGNITION SYSTEM

(75) Inventor: David Wares, Austin, TX (US)

(73) Assignee: The Clorox Company, Oakland, CA (US)

( * ) Notice: Subject to any disclaimer, the term of this patent is extended or adjusted under 35 U.S.C. 154(b) by 1092 days.

(21) Appl. No.: 13/293,027

(22) Filed: Nov. 9, 2011

(65) Prior Publication Data

US 2012/0115092 A1     May 10, 2012

Related U.S. Application Data

(60) Provisional application No. 61/411,922, filed on Nov. 10, 2010.

(51) Int. Cl.
| | |
|---|---|
| *F23B 90/02* | (2011.01) |
| *A47J 37/07* | (2006.01) |
| *F23Q 13/04* | (2006.01) |
| *C10L 5/36* | (2006.01) |
| *C10L 11/04* | (2006.01) |

(52) U.S. Cl.
CPC ............... *F23B 90/02* (2013.01); *A47J 37/079* (2013.01); *C10L 5/368* (2013.01); *C10L 11/04* (2013.01); *F23Q 13/04* (2013.01); *Y10T 29/49826* (2015.01)

(58) Field of Classification Search
CPC ..... C10L 11/04; A47J 37/079; A47J 37/0768; A01G 13/06
USPC ................................ 431/2; 126/25 B; 29/428
See application file for complete search history.

(56) References Cited

U.S. PATENT DOCUMENTS

| | | | | |
|---|---|---|---|---|
| 3,010,809 | A | * | 11/1961 | Peck .............................. 44/520 |
| 4,460,377 | A | * | 7/1984 | Kalil .............................. 44/520 |
| 4,503,835 | A | | 3/1985 | Williams |
| 4,953,533 | A | | 9/1990 | Witt |
| 5,186,721 | A | | 2/1993 | Campana |
| 6,027,539 | A | | 2/2000 | Toy |
| D582,266 | S | | 12/2008 | Helms, Jr. et al. |
| 7,670,392 | B2 | | 3/2010 | Correa et al. |
| 2004/0025419 | A1 | | 2/2004 | Saunders et al. |
| 2004/0035046 | A1 | | 2/2004 | Weissman et al. |
| 2005/0160664 | A1 | | 7/2005 | Stephens |
| 2005/0178052 | A1 | | 8/2005 | Saunders et al. |
| 2006/0156621 | A1 | | 7/2006 | Kraus et al. |
| 2007/0044377 | A1 | | 3/2007 | Correa et al. |
| 2007/0107299 | A1 | | 5/2007 | Saunders et al. |
| 2008/0000467 | A1 | | 1/2008 | Dudley et al. |
| 2008/0092437 | A1 | | 4/2008 | Helms et al. |
| 2009/0007826 | A1 | | 1/2009 | Wares et al. |
| 2009/0205627 | A1 | | 8/2009 | Timmons et al. |
| 2010/0263270 | A1 | | 10/2010 | Correa et al. |

FOREIGN PATENT DOCUMENTS

| | | |
|---|---|---|
| JP | 2000356346 | 12/2000 |
| JP | 2002089844 | 3/2002 |

(Continued)

*Primary Examiner* — Avinash Savani
(74) *Attorney, Agent, or Firm* — Ann Lee

(57) ABSTRACT

Fire ignition systems, combustible ignition structures, and methods of manufacturing and using such systems and devices are disclosed herein. In various embodiments, a fire ignition system may include a combustible container and a combustible ignition structure removably insertable into an interior of the combustible container. In various embodiments, the combustible ignition structure may include a base having a top surface and a chimney extending from the top surface. In various embodiments, the chimney may have an inner flue, a top opening into the flue, and an aperture through a side of the chimney into the flue. Other embodiments may be disclosed herein.

22 Claims, 7 Drawing Sheets

(56) References Cited

FOREIGN PATENT DOCUMENTS

| JP | 2005083581 | 3/2005 |
| JP | 2007271221 | 10/2007 |
| WO | WO9314179 | 7/1993 |
| WO | WO0167936 | 9/2001 |
| WO | WO03099966 A2 | 12/2003 |
| WO | WO2009117433 | 9/2009 |
| WO | WO2009117433 A1 | 9/2009 |

* cited by examiner

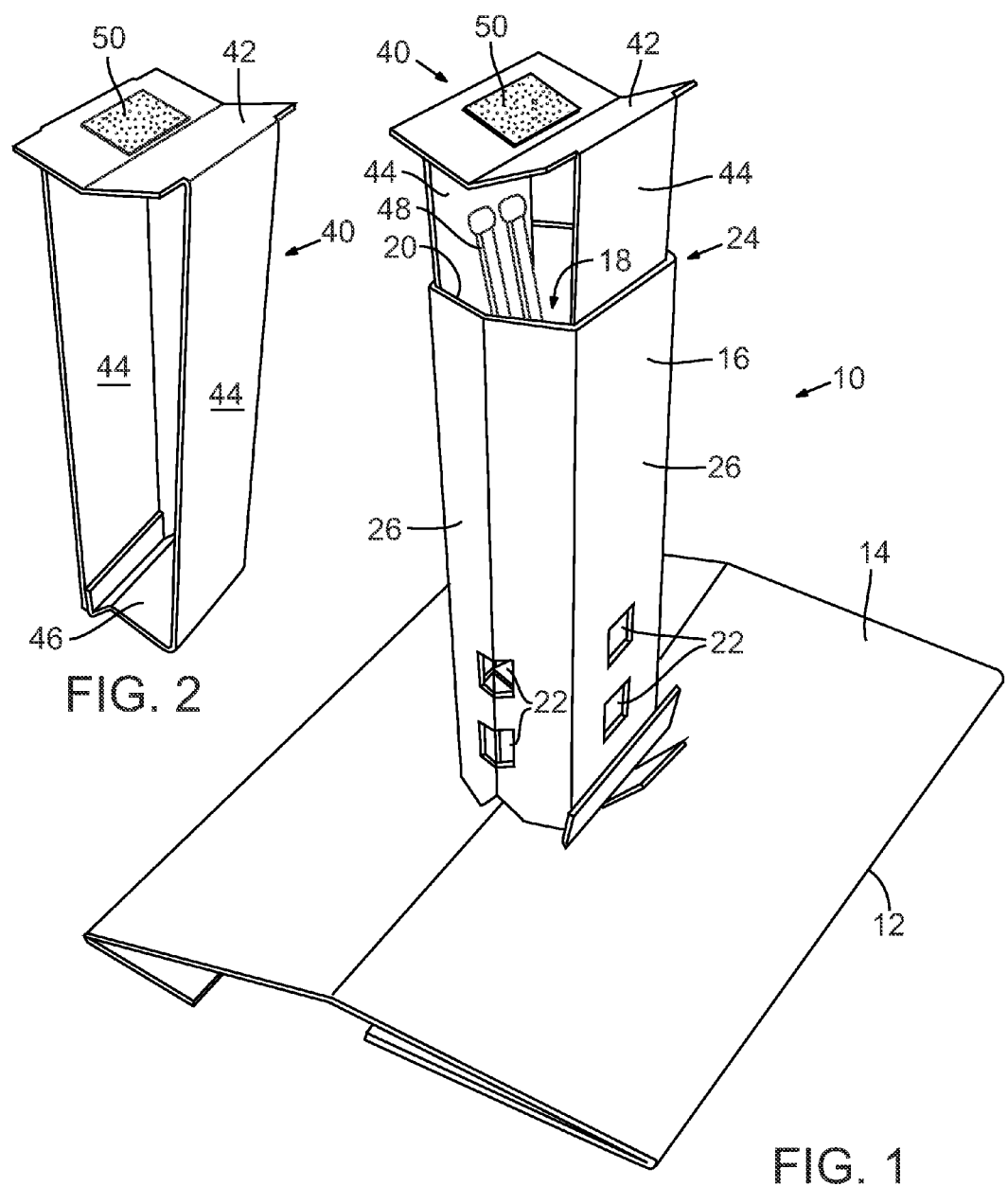

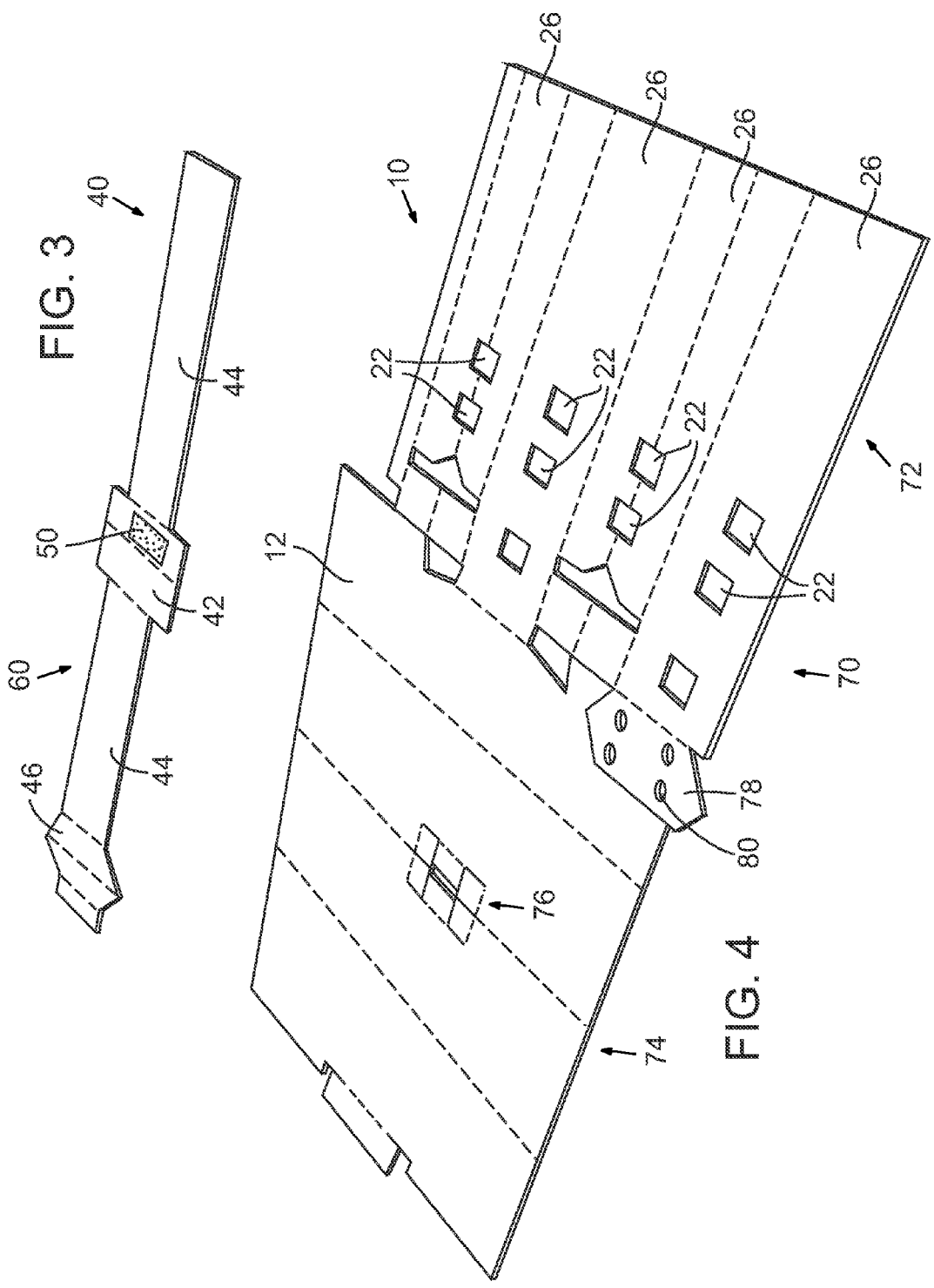

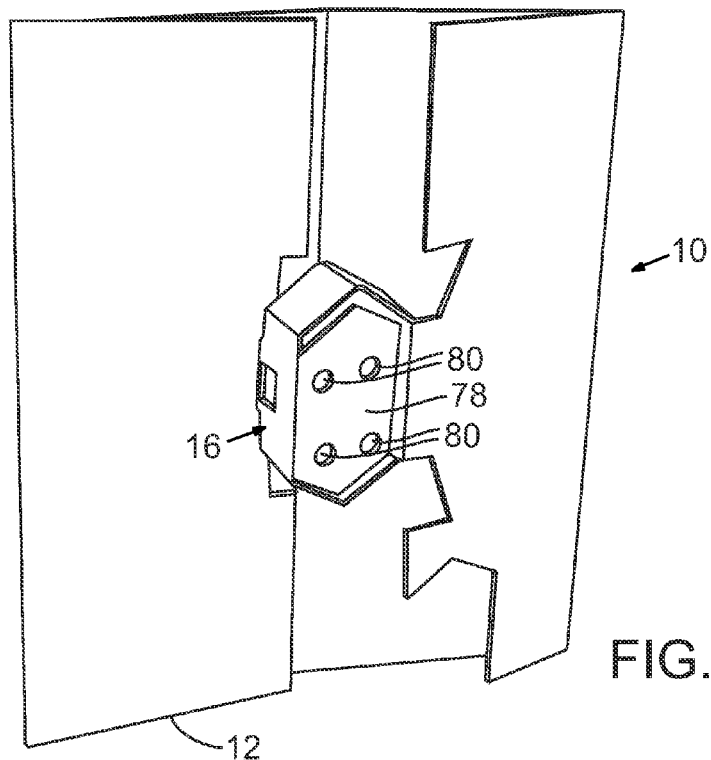
FIG. 10
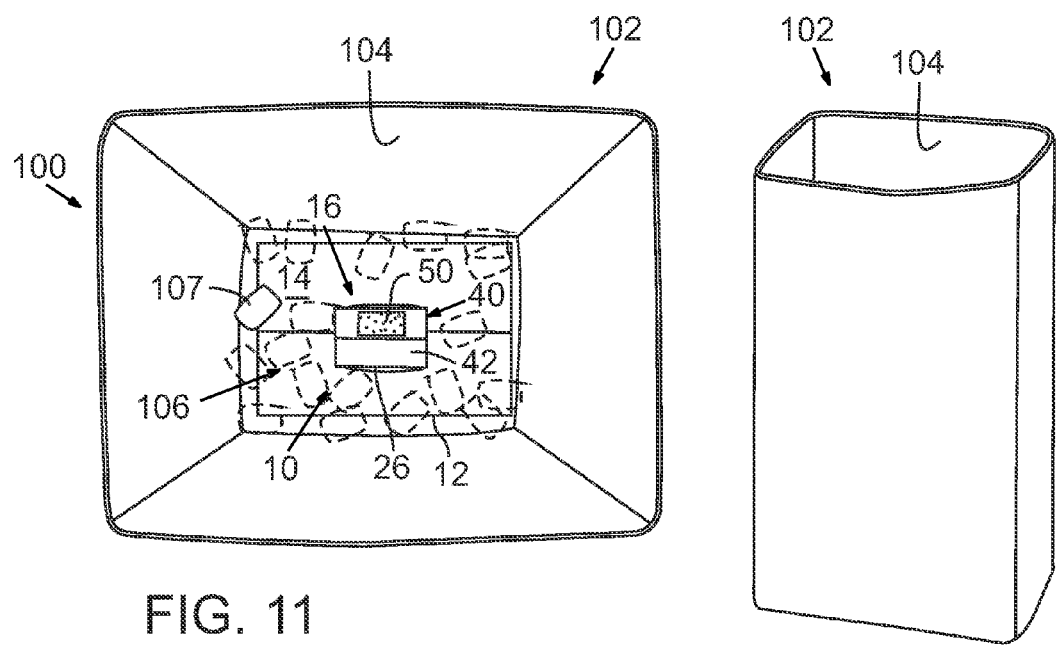
FIG. 11
FIG. 12

FIRE IGNITION SYSTEM

CROSS REFERENCE TO RELATED APPLICATIONS

This application claims priority under 35 U.S.C. §119(e) to U.S. Provisional Patent Application No. 61/411,922 entitled "FIRE IGNITION SYSTEM," filed Nov. 10, 2010, the disclosure of which is incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

A popular way to barbeque food makes use of lump charcoal or charcoal briquettes as a heat source. The heat sources may be ignited and allowed to burn for a period of time after which the embers may be used to smoke cook the food. Unfortunately, traditional methods for igniting charcoal require the use of an igniting fluid or similar aid to burn for a sufficiently long time for the charcoal to ignite. Fumes from the igniting fluid may penetrate into the food, thereby degrading the taste. Moreover, the igniting fluid may be a pollutant, and is a dangerous combustible.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 is a perspective view of a combustible ignition structure, in accordance with various embodiments;

FIG. 2 is a perspective view of an insert that may be used with the embodiment of FIG. 1, in accordance with various embodiments;

FIG. 3 is a perspective view of a single piece of material that may be folded to form the insert of FIG. 2, in accordance with various embodiments;

FIG. 4 is a perspective view of a single piece of material that may be folded to form a combustible ignition structure such as the one depicted in FIG. 1, in accordance with various embodiments;

FIG. 10 is a bottom view of a single piece of material similar to those of FIGS. 4-9, fully assembled, in accordance with various embodiments;

FIG. 11 is a view down into a container of a fire ignition system, in accordance with various embodiments;

FIG. 12 is a perspective view of a container usable in a fire ignition system, in accordance with various embodiments.

DETAILED DESCRIPTION

Figure 5:
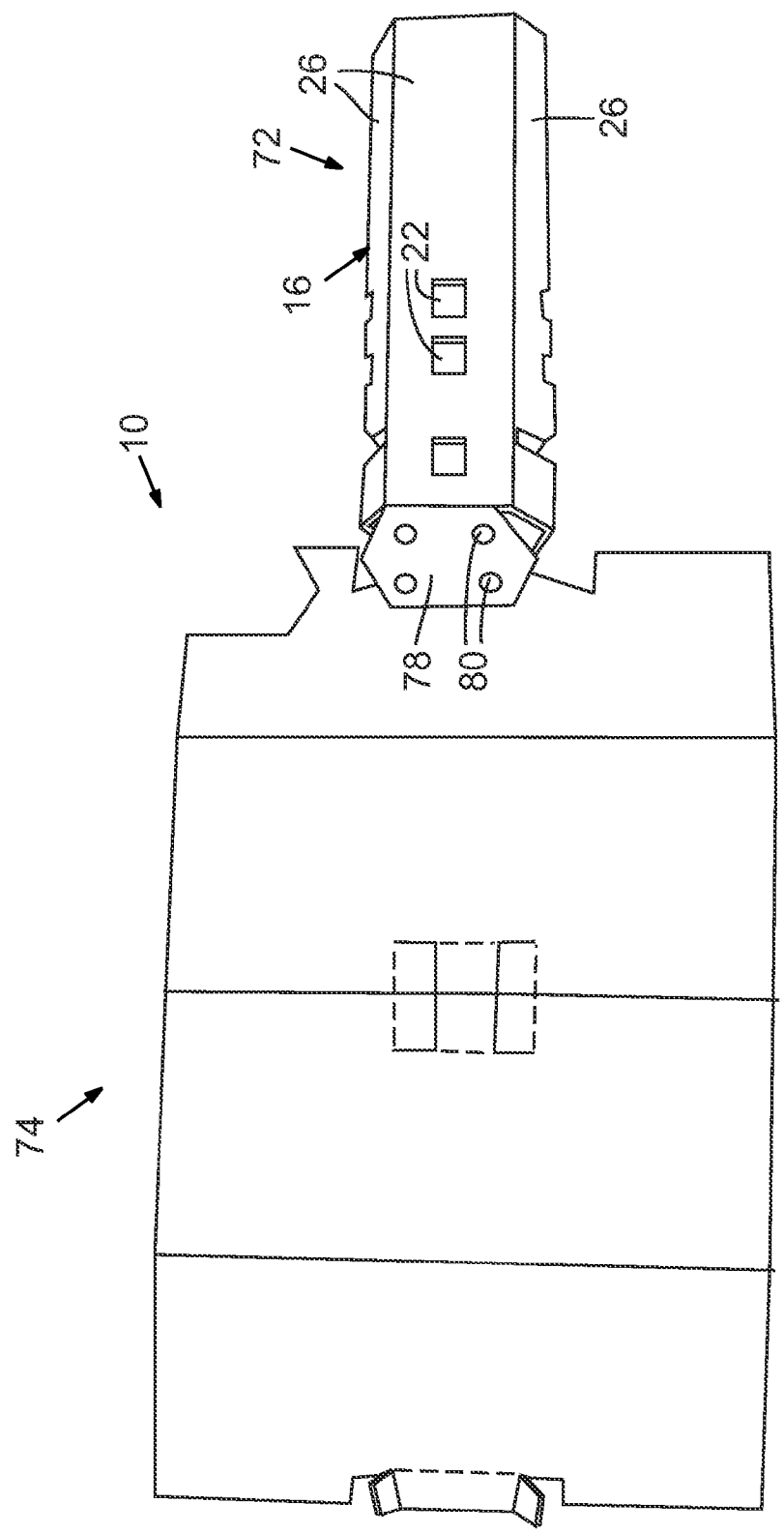
FIG. 5 is a view of a single piece of material similar to that shown in FIG. 4, partially assembled, in accordance with various embodiments.

Reference will now be made to the drawings wherein like numerals refer to like parts throughout. For ease of description, the components of embodiments of the present disclosure are described in the normal (upright) operating position, and terms such as upper, lower, horizontal, etc., are used with reference to this position. It will be understood, however, that the components of embodiments of the present disclosure may be manufactured, stored, transported, used, and sold in an orientation other than the position described.

Figures illustrating the components of embodiments of the present disclosure show some conventional mechanical elements that may be known and that may be recognized by one skilled in the art. The detailed descriptions of such elements that are not necessary to an understanding of the disclosure, and accordingly are herein presented only to the degree necessary to facilitate an understanding of the novel features of the present disclosure.

As used herein and in the appended claims, the term "comprising" is inclusive or open-ended and does not exclude additional unrecited elements, compositional components, or method steps. Accordingly, the term "comprising" encompasses the more restrictive terms "consisting essentially of" and "consisting of."

It must be noted that, as used in this specification and the appended claims, the singular forms "a," "an," and "the" include plural references unless the content clearly dictates otherwise. Similarly, the use of substantially any plural terms herein may be translated by those having skill in the art from the plural to the singular as is appropriate to the context and/or application. The various singular/plural permutations may be expressly set forth herein for sake of clarity.

In those instances where a convention analogous to "at least one of A, B, and C, etc." is used, in general such a construction is intended in the sense one having skill in the art would understand the convention (e.g., "an apparatus having at least one of A, B, and C" would include but not be limited to apparatuses that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

Unless defined otherwise, all technical and scientific terms used herein have the same meaning as commonly understood by one of ordinary skill in the art to which embodiments of the present invention pertain. Although a number of methods and materials similar or equivalent to those described herein can be used in the practice of the present invention, the preferred materials and methods are described herein.

Referring now to FIG. 1, a combustible ignition structure 10 may be removably insertable into an interior of a combustible container (see FIG. 12) to form a fire ignition system (see FIG. 11). Combustible ignition structure 10 may include a base 12 having a top surface 14. In various embodiments, base 12 may have a footprint, rectangular in FIG. 1, which is similar to a footprint of a container into which combustible ignition structure 10 may be inserted. The similar shapes and/or sizes of the footprints may cause combustible ignition structure 10 to be held upright inside of the container and not easily tipped over. Additionally, in various embodiments, chimney 16 may be generally centered on top surface 14, and so the similar footprints may ensure chimney 16 is centered within the container.

Chimney 16 may extend from top surface 14, e.g., in a direction perpendicular to top surface 14. In various embodiments, chimney 16 may define an inner flue 18, a top opening 20 into flue 18, and/or one or more apertures 22 through a side wall 26 of chimney 16 into flue 18. In various embodiments, flue 18 may have various cross-sectional polygon shapes other than the depicted irregular hexagon, such as generally rectangular, generally circular, oval-shaped, triangular, and so forth. Apertures 22 may be at various positions on side wall 26 of chimney 16, such as closer to top surface 14 of base 12 than a top 24 of chimney 16, as shown in FIG. 1. Apertures 22 may permit combustible gases such as oxygen to flow into flue 18 once chimney 16 is ignited. For example, in FIG. 1, one or more side walls 26 include two apertures 22. In various embodiments, other numbers of apertures 22 may be included on one or more side walls 26. Apertures 22 may be various shapes, such as square (see FIG. 1), circular, oval-shaped, triangular, and so forth.

An insert 40 may be removably insertable into flue 18 of chimney 16. Insert 40 may be used to retain objects within flue 18. To this end, insert 40 may include a top flap 42 sized to at least partially block top opening 20 of chimney 16. In various embodiments, and as best seen in FIG. 2, top flap 42 may connect two elongate planar pieces 44 that may be approximately parallel to each other and approximately perpendicular to top flap 42. In various embodiments, elongate planar pieces 44 may be sized similarly to one or more side walls 26 of chimney 16. In various embodiments, insert 40 may include a bottom portion 46 generally perpendicular to and connecting the bottoms of elongate planar pieces 44.

In various embodiments, an ignition device 48 may be removably retainable in flue 18 of chimney 16 using insert 40. For example, a striking surface 50 may be mounted on a surface of the insert 40 or chimney 16, such as top flap 42. In such embodiments, ignition device 48 may be a long-stemmed match. Once a tip of the long-stemmed match is ignited, the long-stemmed match may be placed into flue 18, e.g., flame first, so that the flame contacts chimney 16 at or near apertures 22, facilitating ignition of chimney 16 and, ultimately, combustible ignition structure 10.

FIG. 3 depicts a single piece of foldable material 60 that may be used to construct insert 40. The dashed lines indicate example locations that may be weakened to be easily foldable into the shape shown in FIG. 2. In various embodiments, bottom portion 46 may be connected to the elongate planar piece 44 to which it is not already connected using various mechanisms, such as staples and/or adhesives. The single piece of foldable material 60 may be constructed from various materials. In various embodiments, single piece of foldable material 60 may be constructed of a combustible material, such as cardboard, so that it can be placed into a fire that has already been ignited using combustible ignition structure 10.

FIG. 4 depicts a second single piece of foldable material 70 that may be used to construct a combustible ignition structure such as combustible ignition structure 10 of FIG. 1. Second single piece of foldable material 70 may be constructed from a combustible material such as cardboard. As seen in FIG. 4, prior to construction, second single piece of foldable material 70 may be generally flat, which increases the ease-of-shipping. For example, multiple pieces of foldable material 70 that are not yet constructed may be stacked on top of one another so that they do not take up as much space as they would fully constructed.

A first portion 72 of foldable material 70 may be formed into chimney 16. An example of this is seen in FIG. 5. Various parts of first portion 72 of foldable material 70 may be fastened to each other using various mechanisms, such as staples or adhesives. For example, first portion 72 may be "rolled" so that two side walls 26 on opposite sides come into contact, at which point they may be glued together to form chimney 16, as shown in FIG. 5.

Referring back to FIG. 4, a second portion 74 of foldable material may be folded into base 12. Second portion 74 may include a weakened portion 76 that, as seen best in FIGS. 6 and 7, may be opened and/or pierced with chimney 16 during manufacturing to create a bottom opening 77.

Figure 6:
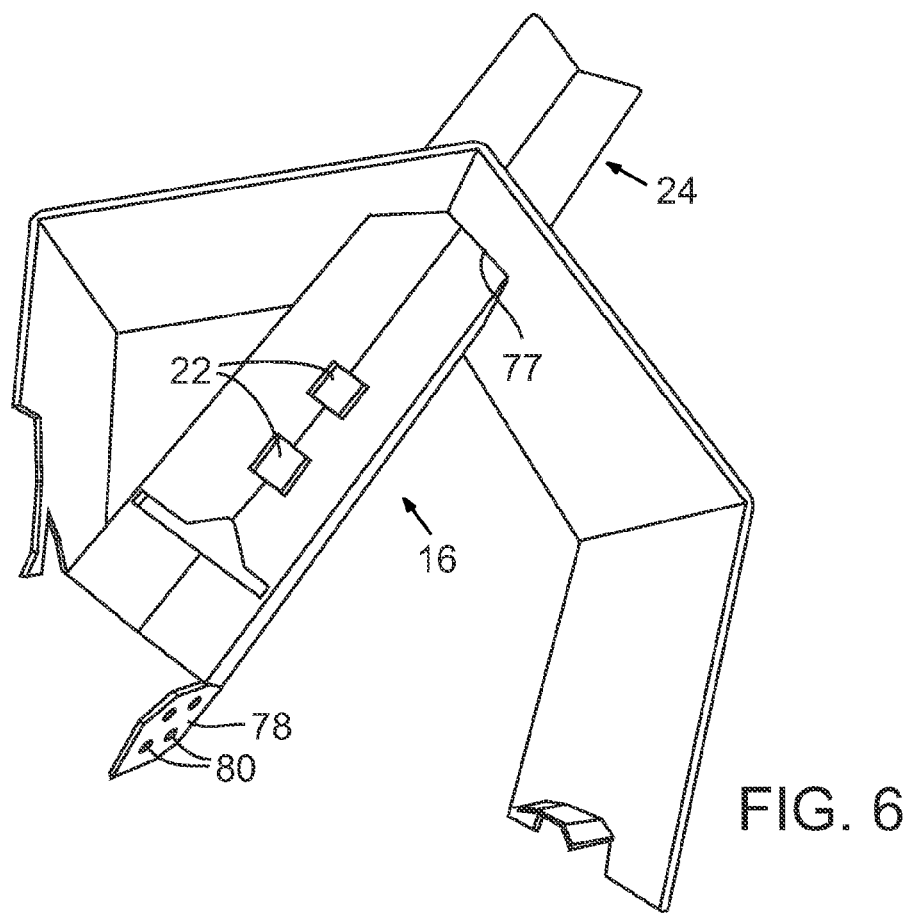
FIG. 6 is a perspective view of a single piece of material similar to those shown in FIGS. 4-5, at a later stage of assembly, in accordance with various embodiments.
Figure 7:
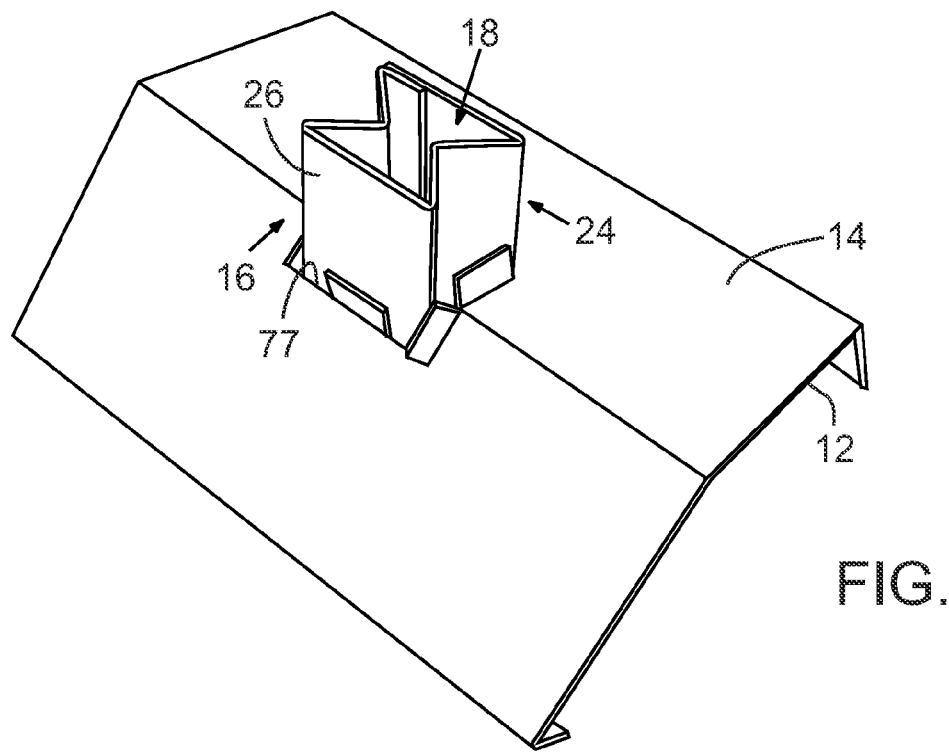
FIG. 7 is another perspective view of the single piece of material of FIG. 6 at a similar stage of assembly, in accordance with various embodiments.
Figure 8:
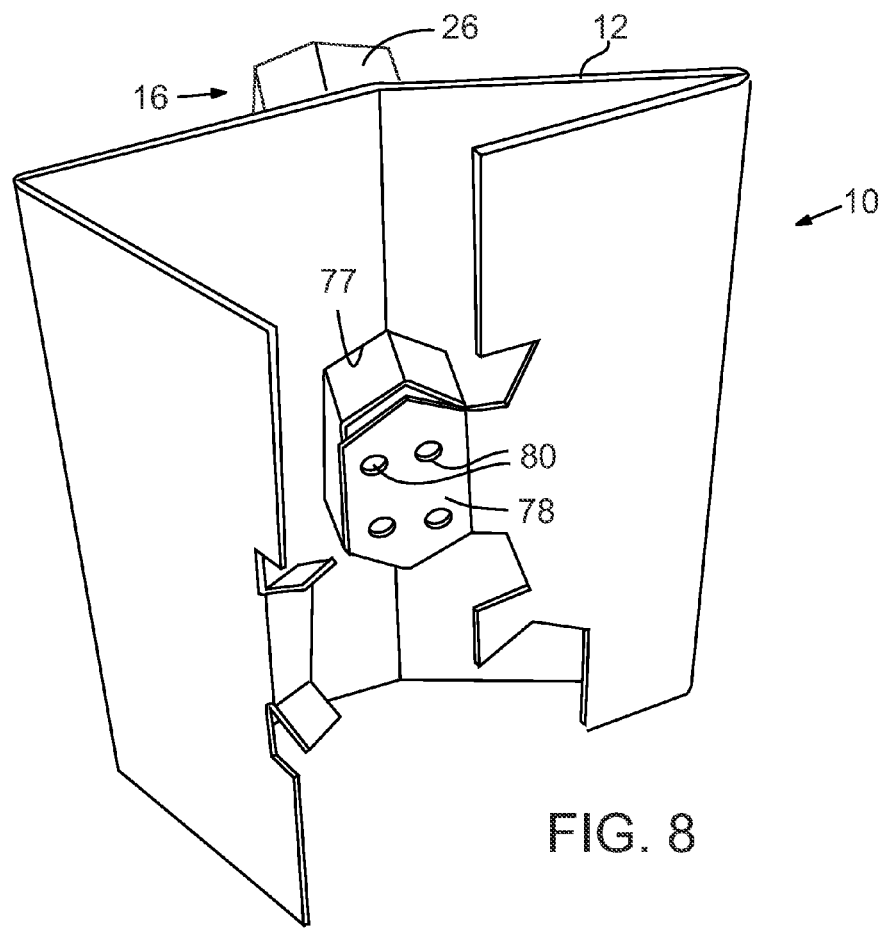
FIG. 8 is a bottom view of a single piece of material similar to those of FIGS. 4-7, at yet a later stage of assembly, in accordance with various embodiments.

In FIG. 6, single piece of foldable material 70 is at a later stage of construction. A bottom flap 78 having one or more bottom flap apertures 80 hangs down from a bottom of chimney 16. Chimney 16 may be pierced through bottom opening 77. In FIG. 7, top 24 of chimney 16 is seen extending through bottom opening 77 and partially extending from top surface 14 of base 12. As seen best in FIG. 7, in various embodiments side walls 26 may be configured so that chimney 16 is slightly collapsible. This may allow side walls 26 to collapse inward to facilitate piercing chimney 16 through bottom opening 77. Having a slightly collapsible chimney 16 may also facilitate shipping, where the weight of a combustible material such as cardboard may cause chimney 16 to collapse inward. FIG. 8 is a view of a bottom of single piece of foldable material 70 at yet a later stage of construction.

Figure 9:
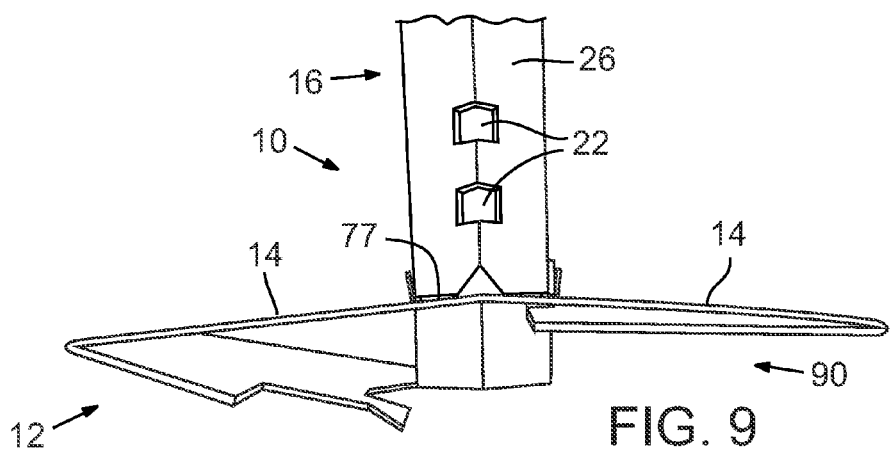
FIG. 9 is a side view of a single piece of material similar to those of FIGS. 4-8, fully assembled, in accordance with various embodiments.

FIG. 9 is a side view of a part of a combustible ignition structure 10 similar to that shown in FIGS. 4-8, fully assembled. Portions of top surface 14 on opposite sides of chimney 16 may slope away from chimney 16. In some embodiments, top surface 14 may be shaped to form two sides of a generally triangular cross sectional shape of base 12. Shaping base 12 in this manner may define an air pocket 90 beneath base 12 that facilitates combustion of combustible ignition structure 10. FIG. 10 is a bottom view of combustible ignition structure 10, fully assembled, that shows the bottom flap apertures 80, which may be in communication with air pocket 90, so that gas such as oxygen may be drawn from air pocket 90 through bottom flap apertures 80 into flue 18, thereby providing fuel for a fire. A generally triangular cross-sectional shape may also allow base 12 to be slightly collapsible, e.g., under the weight of a solid fuel such as wood pellets, charcoal or other combustible material, which may be beneficial for horizontal palletizing.

FIG. 11 depicts a fire ignition system 100 that includes combustible ignition structure 10 placed inside of a container 102. FIG. 12 is a perspective view of an example container 102. In various embodiments, container 102 may be constructed from combustible materials such as paper or cardboard. In various embodiments, container 102 may be a paper bag with two or more walls 104 of the bag secured together near a top of the bag to close a top opening.

In FIG. 11, combustible ignition structure 10 is shown placed into an interior of container 102. A space 106 surrounding chimney 16 may be at least partially filled with solid fuel 107 such as wood pellets, charcoal or other combustible material. Insert 40 may be removed from flue 18 of chimney 16. An ignition device 48 (see FIG. 1) such as a long-stemmed match may be retrieved from insert 40 or flue 18. Ignition device 48 may be ignited and placed back into flue 18 to cause chimney 16 to ignite. As chimney 16 burns, the fire may be fed by an airflow from air pocket 90 defined below base 12. The fire may additionally or alternatively be fed through apertures 22 on side walls 26 of chimney 16. In addition, air pocket 90 may provide air as fuel so that the fire can burn base 12, thereby igniting the solid fuel 107 from underneath, as well as from the middle (at chimney 16).

Figure 13:
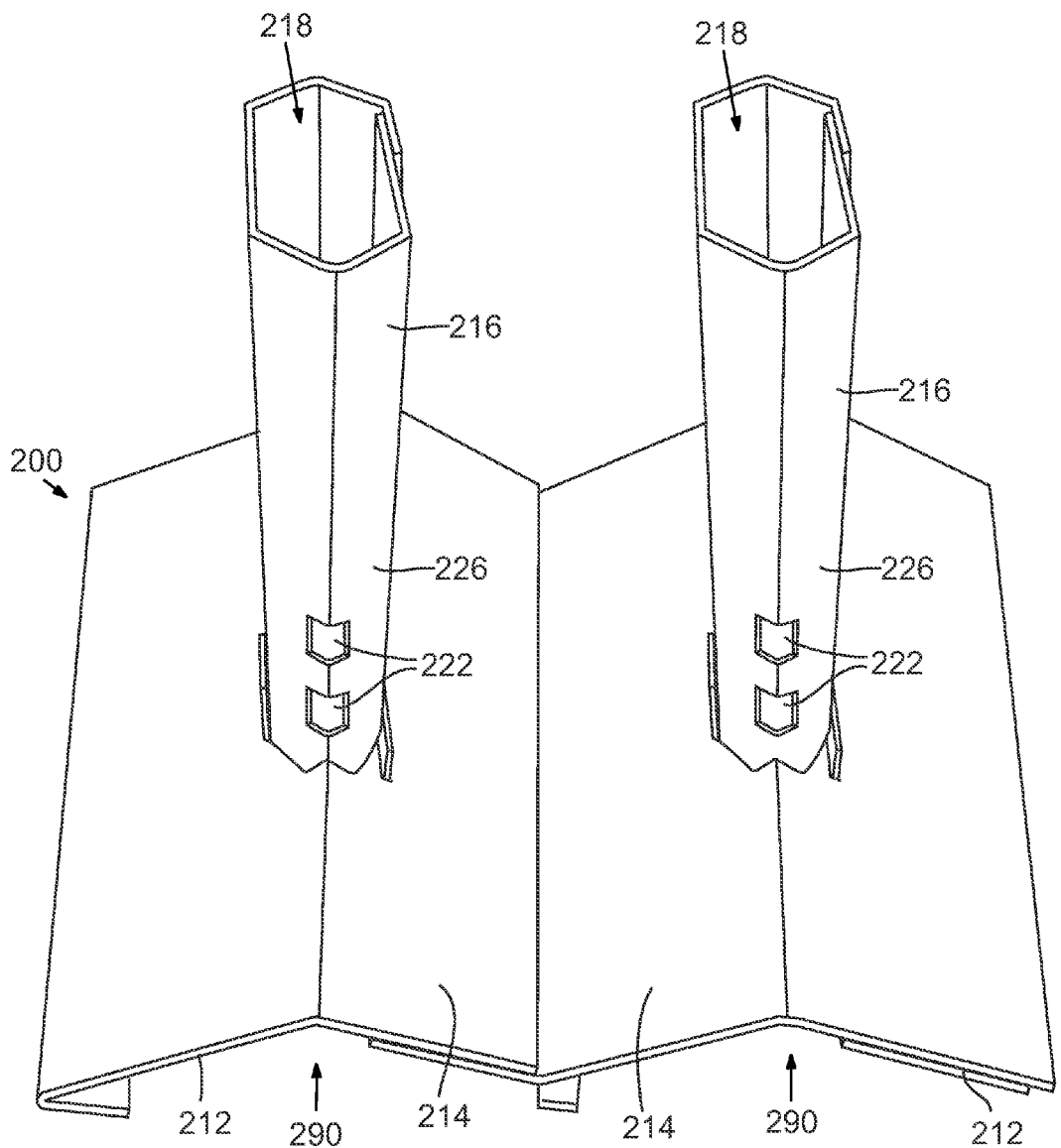
FIG. 13 is a perspective view of an embodiment of a combustible ignition structure that includes two chimneys, in accordance with various embodiments.

In various embodiments, an ignition structure may include more than one chimney. Referring to FIG. 13, an ignition structure 210 may have two chimneys 216 defining two separate flues 218. Device 200 may be placed in a location where a fire is desired, such as on top of a grill or in a fire pit, as well as into a container similar to container 102 that is large enough to receive both chimneys 216. Solid fuel such as charcoal, wood pellets or other combustible material may be placed in the spaces surrounding the two chimneys 216. An ignition device such as a long-stemmed match may be ignited and placed into one or both flues 218 to cause chimneys 216 to ignite. As chimneys 216 burn, the fire may be fed by an airflow from one or more air pockets 290 defined below a base 212. The fire may additionally or alternatively be fed through apertures 222 on the sides of chimneys 216.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the appended claims.

What is claimed is:

1. A fire ignition system, comprising:
 a combustible container; and
 a combustible ignition structure removably insertable into an interior of the combustible container and including:
  a base having a top surface; and
  a chimney extending from the top surface, the chimney having an inner flue, a top opening into the flue, and an aperture through a side of the chimney, wherein the aperture through the side of the chimney is closer to the top surface of the base than a top of the chimney and wherein the chimney includes at least four side walls, each side wall including an aperture through the side wall closer to the top surface of the base than the top of the chimney.

2. The fire ignition system of claim 1, further comprising an insert removably insertable into the flue of the chimney and including a top flap sized to at least partially block the top opening of the chimney.

3. The fire ignition system of claim 2, wherein the top flap connects two elongate planar pieces that are foldable to be parallel to each other and perpendicular to the top flap.

4. The fire ignition system of claim 2, wherein the elongate planar pieces are sized similarly to one or more walls of the chimney.

5. The fire ignition system of claim 2, further comprising an ignition device removably retainable in the flue of the chimney with the insert.

6. The fire ignition system of claim 5, further comprising a striking surface mounted on a surface of the insert or the chimney, wherein the ignition device is a match.

7. The fire ignition system of claim 6, wherein the match is a long-stemmed match.

8. The fire ignition system of claim 1, wherein portions of the top surface of the base on opposite sides of the chimney slope away from the chimney.

9. The fire ignition system of claim 8, wherein the portions of the top surface sloping away from the chimney form two sides of a generally triangular cross section of the base.

10. The fire ignition system of claim 1, wherein the chimney and base are constructed with a single piece of foldable material.

11. A fire ignition system, comprising:
 a combustible container;
 solid fuel insertable into the combustible container; and
 a combustible ignition structure constructed with a single piece of foldable material removably insertable into an interior of the combustible container and including:
  a base having a top surface; and
  a chimney extending from the top surface, the chimney having an inner flue, a top opening into the flue, and an aperture through a side of the chimney wherein the combustible ignition structure is ignitable to ignite the solid fuel, wherein the chimney includes at least four side walls, each side wall including an aperture through the side wall closer to the top surface of the base than the top of the chimney.

12. The fire ignition system of claim 11, further comprising an insert removably insertable into the flue of the chimney and including a top flap sized to at least partially block the top opening of the chimney.

13. The fire ignition system of claim 12, wherein the top flap connects two elongate planar pieces that are foldable to be parallel to each other and perpendicular to the top flap.

14. The fire ignition system of claim 12, wherein the elongate planar pieces are sized similarly to one or more walls of the chimney.

15. The fire ignition system of claim 12, further comprising an ignition device removably retainable in the flue of the chimney with the insert.

16. The fire ignition system of claim 15, further comprising a striking surface mounted on a surface of the insert or the chimney, wherein the ignition device is a match.

17. The fire ignition system of claim 16, wherein the match is a long-stemmed match.

18. The fire ignition system of claim 11, wherein portions of the top surface of the base on opposite sides of the chimney slope away from the chimney.

19. The fire ignition system of claim 18, wherein the portions of the top surface sloping away from the chimney form two sides of a generally triangular cross section of the base.

20. A fire ignition system, comprising:
- a combustible bag defining an interior and a bottom surface having a footprint;
- a combustible ignition structure comprising a foldable cardboard sheet, said combustible ignition structure being removably insertable into an interior of the combustible bag and including:
  - a base having a similar footprint as the combustible bag; and
  - a chimney extending from a center of the base and having a top opening into an inner flue;
- wherein the chimney is defined by a first portion of the foldable cardboard sheet, the first portion having a plurality of subsections within the first portion, where opposed end subsections of the first portion are joined to form the chimney having an elongate chimney shape with a central opening therethrough, each of the subsections defining the sidewalls of the chimney, and
- wherein the base is defined by a second portion of the foldable cardboard sheet, the second portion of the foldable cardboard sheet extending from the first portion of the foldable cardboard sheet, the second portion having a bottom opening through which the chimney defined by the first portion of the foldable cardboard sheet extends.

21. The fire ignition system of claim 20, further comprising solid fuel insertable into the combustible bag about the chimney, to be between the bag and the chimney.

22. The fire ignition system of claim 20, wherein the combustible ignition structure comprises a single continuous foldable cardboard sheet.

* * * * *